United States Patent
Tarao et al.

(10) Patent No.: US 8,415,421 B2
(45) Date of Patent: *Apr. 9, 2013

(54) TWO-COMPONENT CURING TYPE URETHANE-BASED AQUEOUS GOLF BALL PAINT

(75) Inventors: Toshiyuki Tarao, Kobe (JP); Kuniyasu Horiuchi, Kobe (JP); Hirokazu Okamoto, Amagasaki (JP); Masahiko Shiraishi, Amagasaki (JP)

(73) Assignees: SRI Sports Limited, Kobe-shi (JP); Shinto Paint Co., Ltd., Amagasaki-shi (JP)

( * ) Notice: Subject to any disclaimer, the term of this patent is extended or adjusted under 35 U.S.C. 154(b) by 566 days.

This patent is subject to a terminal disclaimer.

(21) Appl. No.: 12/641,024

(22) Filed: Dec. 17, 2009

(65) Prior Publication Data

US 2010/0167847 A1   Jul. 1, 2010

(30) Foreign Application Priority Data

Dec. 26, 2008   (JP) ................................. 2008-334978

(51) Int. Cl.
*A63B 37/00* (2006.01)
*C09D 175/04* (2006.01)
*C09D 133/04* (2006.01)

(52) U.S. Cl. ........ 524/507; 524/501; 524/267; 524/268; 524/269; 525/127; 525/131; 473/351; 473/371; 473/378

(58) Field of Classification Search .................. None
See application file for complete search history.

(56) References Cited

U.S. PATENT DOCUMENTS

| | | | | |
|---|---|---|---|---|
| 5,461,109 A | * | 10/1995 | Blair et al. | .................... 524/839 |
| 5,830,938 A | * | 11/1998 | St. Laurent et al. | ........... 524/317 |
| 6,210,295 B1 | | 4/2001 | Yoneyama | |
| 6,387,385 B1 | * | 5/2002 | Wang | ............................ 424/408 |
| 6,454,667 B1 | | 9/2002 | Iwami | |
| 6,509,410 B2 | | 1/2003 | Ohira et al. | |
| 7,141,628 B2 | | 11/2006 | Isogawa et al. | |
| 7,371,193 B2 | | 5/2008 | Isogawa et al. | |
| 8,137,753 B2 | * | 3/2012 | Tarao et al. | .................... 427/316 |
| 2001/0034398 A1 | | 10/2001 | Ohira et al. | |
| 2004/0043838 A1 | | 3/2004 | Isogawa et al. | |
| 2004/0116623 A1 | | 6/2004 | Isogawa et al. | |
| 2005/0282660 A1 | | 12/2005 | Isogawa et al. | |
| 2005/0282661 A1 | | 12/2005 | Fujisawa et al. | |
| 2006/0178471 A1 | | 8/2006 | Sasaki et al. | |
| 2009/0054570 A1 | * | 2/2009 | Wu et al. | ........................ 524/197 |
| 2009/0110837 A1 | * | 4/2009 | Wachi | ........................ 427/385.5 |
| 2011/0105247 A1 | * | 5/2011 | Tarao et al. | .................... 473/378 |

FOREIGN PATENT DOCUMENTS

| | | |
|---|---|---|
| AU | 694540 B2 | 3/1996 |
| JP | 8-71177 A | 3/1996 |
| JP | 10-151224 A | 6/1998 |
| JP | 2000-288125 A | 10/2000 |
| JP | 2001-271027 A | 10/2001 |
| JP | 2004-89364 A | 3/2004 |
| JP | 2004-187829 A | 7/2004 |
| JP | 2006-556 A | 1/2006 |
| JP | 2006-557 A | 1/2006 |
| JP | 2006-218046 A | 8/2006 |

OTHER PUBLICATIONS

BYK Additives & Instruments; BYK-340 product literature; Feb. 2008.*

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a two-component curing type urethane-based aqueous golf ball paint, which is excellent in gloss of a paint film and evenness of the film thickness. Another object of the present invention is to provide a two-component curing type urethane-based aqueous golf ball paint, which is excellent in adhesion to the surface of a golf ball body.

The present invention provides a two-component curing type urethane-based aqueous golf ball paint containing (A) an aqueous polyol composition and (B) an aqueous polyisocyanate, wherein the aqueous paint has a contact angle of 45° or less to a resin component constituting an outermost layer of a golf ball body and a paint film has reflectivity of 70% or more at an incident angle of 20°.

20 Claims, 1 Drawing Sheet

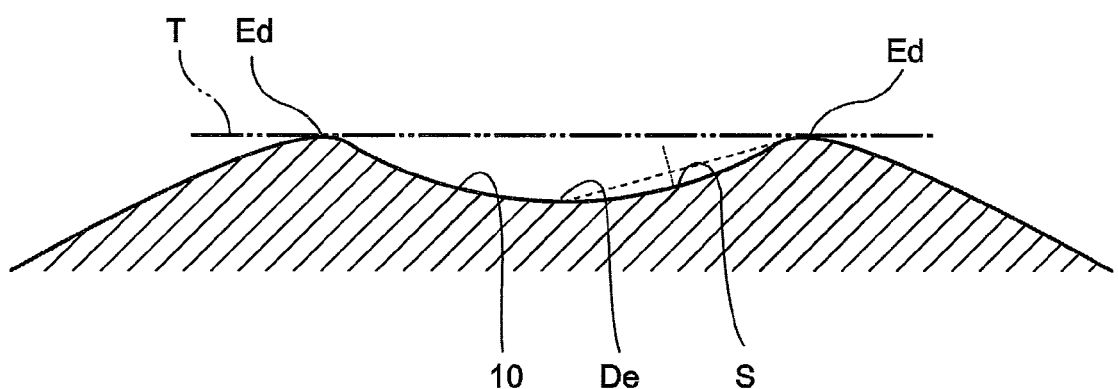

TWO-COMPONENT CURING TYPE URETHANE-BASED AQUEOUS GOLF BALL PAINT

FIELD OF THE INVENTION

The present invention relates to a two-component curing type urethane-based aqueous golf ball paint and a painted golf ball.

DESCRIPTION OF THE RELATED ART

A conventional golf ball has a paint film on the surface of the golf ball body. The paint film is formed to protect the golf ball body from deteriorating due to the exposure of the golf ball body to a sunlight and/or the weather and to improve the appearance thereof by imparting a gloss to the golf ball body. Various paints for forming such a paint film have been developed. For example, Japanese Patent Publication No. 2001-271027 A discloses an aqueous paint composition for a golf ball, which includes a hydrophilic group-containing polyisocyanate, and a water-soluble urethane polyol having a hydroxyl value of 100 to 300 which is obtained through reaction between a polyol component and a polyisocyanate component. Japanese Patent Publication No. 2004-187829 A discloses a paint for a golf ball, which includes a polyisocyanate, and an aqueous liquid of an aqueous polyol which has a hydroxyl value from 50 mg KOH/g and below 100 mg KOH/g, and has a weight average molecular weight ranging from 4,000 to 20,000.

A golf ball is repeatedly hit and used. Therefore, the paint film for a golf ball needs to have an adhesion property against the impact. In particular, when a golf ball is hit, the golf ball body deforms. Unless the paint film covering the golf ball body does not follow the deformation of the golf ball body, the paint film tends to peel off. Further, the paint film may peel off when the golf ball is subject to the friction against the club surface when hitting the golf ball or against the ground surfaces such as sand in a bunker or rough when landing on the ground.

As a method for enhancing the adhesion of a paint film to the surface of a golf ball body, Japanese Patent Publication No. 2006-557 A discloses, for example, a method for producing a golf ball in which a marking is placed on the surface of a golf ball body, and a two-component curing type aqueous paint which includes a base material, a curing agent, and a solvent is used as an aqueous paint for forming a paint film, and a resin component for forming the marking is cured by using the curing agent included in the aqueous paint.

As a golf ball having an enhanced adhesion of a paint film to the surface of a golf ball body, Japanese Patent Publication No. 2006-556 A discloses a golf ball, having a golf ball body and a paint film covering the golf ball body, wherein the paint film is obtained from an aqueous paint, and the paint film has an elongation at break of 80% or more, and maximum stress of 170 kgf/cm$^2$ or more. Further, Japanese Patent Publication No. 2006-218046 A discloses a golf ball, having a golf ball body and a paint film covering the golf ball body, in which the paint film is obtained by curing a paint composition which contains a carboxyl group-containing aqueous polyol, an aqueous polyisocyanate, and an aqueous polycarbodiimide.

SUMMARY OF THE INVENTION

A two-component curing type urethane-based aqueous paint contains water as a main component of its solvent, and the solvent is not readily volatilized during a painting process. Accordingly, if the paint is applied to the surface of the golf ball body, since the paint contains a large amount of solvent, the paint is likely to sag. Consequently, when the two-component curing type urethane-based aqueous paint is applied to the surface of a golf ball body, it is difficult to form a paint film having an even film thickness, due to the particular shape of the dimples formed on the surface of the golf ball body. This kind of problem is not remarkably improved by adding an thixotropy-enhancing agent to the paint. Further, the approach to reduce the water content of the paint (increase the ratio of the solid content) causes a short pot life, increases the viscosity, and thus, the painting process becomes difficult.

The present invention has been made in view of the above circumstances, and an object of the present invention is to provide a two-component curing type urethane-based aqueous golf ball paint, which is excellent in gloss of a paint film and evenness of the film thickness. Another object of the present invention is to provide a two-component curing type urethane-based aqueous golf ball paint, which is excellent in adhesion to the surface of a golf ball body.

The present invention, which has solved the above problem, provides a two-component curing type urethane-based aqueous golf ball paint containing (A) an aqueous polyol composition and (B) an aqueous polyisocyanate, wherein the paint has a contact angle of 45° or less to the resin component constituting the outermost layer of the golf ball body and the paint film has reflectivity of 70% or more at an incident angle of 20°.

According to the present invention, controlling the contact angle of the paint to the resin component constituting the outermost layer of the golf ball body to be 45° or less improves the wettability of the paint to the surface of the golf ball body and the leveling of the paint, and thus the sagging of the paint is suppressed. Further, since the paint film has reflectivity of 70% or more at an incident angle of 20°, the gloss becomes better. As a result, the two-component curing type urethane-based aqueous golf ball paint of the present invention provides the paint which is excellent in gloss of a paint film and evenness of the film thickness.

According to the present invention, it is possible to obtain the two-component curing type urethane-based aqueous golf ball paint which is excellent in the gloss of the paint film and the even thickness of the paint film. Further, according to the present invention, it is also possible to obtain the two-component curing type urethane-based aqueous golf ball paint which is excellent in the adhesion of the paint film to the golf ball body.

BRIEF DESCRIPTION OF THE DRAWINGS

FIG. 1 is an expanded sectional view of the dimples formed on the surface of the golf ball body.

DESCRIPTION OF THE PREFERRED EMBODIMENT

The present invention provides a two-component curing type urethane-based aqueous golf ball paint containing (A) an aqueous polyol composition and (B) an aqueous polyisocyanate, wherein the paint has a contact angle of 45° or less to the resin component constituting the outermost layer of the golf ball body and the paint film has reflectivity of 70% or more at an incident angle of 20°.

When the contact angle of the paint to the resin component constituting the outermost layer of the golf ball body is 45° or less, the leveling of the paint on the surface of the golf ball body becomes good, the appearance of the painted golf ball obtained is also good, and the evenness of the thickness of the paint film is enhanced. The contact angle is preferably 43° or less, and more preferably 40° or less. The lower limit of the contact angle is not limited, but is usually 35°.

The contact angle of the paint to the resin component constituting the outermost layer of the golf ball body is adjustable by changing, as necessary, types and formulating amounts of (A) the aqueous polyol composition and (B) the aqueous polyisocyanate described below, and by changing, as necessary, types and formulating amounts of additives such as a leveling agent.

In a one-piece golf ball consisting of a single layer, the resin component constituting the outermost layer of the golf ball body is a resin component and/or a rubber composition constituting the one-piece golf ball body. In a multi-piece golf ball having a core and a cover covering the core, the resin component constituting the outermost layer of the golf ball body is a resin component and/or a rubber composition constituting the cover.

Further, the resin component constituting the outermost layer of the golf ball body is preferably an ionomer resin or a rubber composition. Accordingly, the two-component curing type urethane-based aqueous golf ball paint according to the present invention preferably has a contact angle of 45° or less to the ionomer resin or the rubber composition. The two-component curing type urethane-based aqueous golf ball paint according to the present invention preferably has a contact angle of 45° or less to either of the ionomer resin and the rubber composition, more preferably has a contact angle of 45° or less to both of the ionomer resin and the rubber composition.

The ionomer resin to which the two-component curing type urethane-based aqueous golf ball paint according to the present invention has a contact angle of 45° or less is not limited. The two-component curing type urethane-based aqueous golf ball paint according to the present invention more preferably has the contact angle of 45° or less to an ionomer resin which is obtained by neutralizing at least a part of carboxyl groups in a binary copolymer of ethylene and (meth)acrylic acid with a metal ion, or which is obtained by neutralizing at least a part of carboxyl groups in a ternary copolymer of ethylene, (meth)acrylic acid, and (meth)acrylic acid ester with a metal ion, or which is a mixture thereof. In the above description, (meth)acrylic acid represents acrylic acid and/or methacrylic acid.

Examples of the metal ions which neutralize at least a part of the carboxyl groups in the binary copolymer of ethylene and (meth)acrylic acid, or at least a part of the carboxyl groups in the ternary copolymer of ethylene, (meth)acrylic acid, and (meth)acrylic acid ester include: monovalent alkali metal ions such as sodium, potassium, and lithium; divalent metal ions such as magnesium, calcium, zinc, barium, and cadmium; trivalent metal icons such as aluminum; and other ions such as tin and zirconium. Divalent metal ions such as magnesium, calcium, zinc, barium, and cadmium are preferable, and zinc is more preferable.

Further, the rubber composition to which the two-component curing type urethane-based aqueous golf ball paint according to the present invention has a contact angle of 45° or less is not limited. The two-component curing type urethane-based aqueous golf ball paint according to the present invention preferably has a contact angle of 45° or less to a cured product of the rubber composition containing a diene rubber as a base rubber, a co-crosslinking agent and a crosslinking initiator. In particular, it is preferable that the two-component curing type urethane-based aqueous golf ball paint according to the present invention has a contact angle of 45° or less to a rubber composition which contains at least 50% by mass of a base rubber such as a polybutadiene rubber, a natural rubber, a polyisoprene rubber, a styrene-polybutadiene rubber, and an ethylene-propylene-diene rubber (EPDM).

If the paint film has reflectivity of 70% or more at an incident angle of 20°, the appearance of the painted golf ball obtained becomes good. The reflectivity is preferably 75% or more, and more preferably 80% or more. The upper limit of the reflectivity is not limited. The reflectivity of the paint film at an incident angle of 20° is adjustable by changing, as necessary, types and formulating amounts of (A) the aqueous polyol composition and (B) the aqueous polyisocyanate described below, and by changing, as necessary, types and formulating amounts of additives such as the leveling agent.

The 10% stress of the paint film is preferably 2.0 MPa or more, and more preferably 2.5 MPa or more, and even more preferably 3.0 MPa or more, and is preferably 35 MPa or less, and more preferably 30 MPa or less, and even more preferably 25 MPa or less. If the 10% stress is 2.0 MPa or more, the paint film is not excessively soft, and the adhesion to the surface of the golf ball body is enhanced. If the 10% stress is 35 MPa or less, the paint film is not excessively hard, and the paint film is unlikely to be cracked when the painted golf ball is hit. In other words, the adhesion to the surface of the golf ball body becomes better. The 10% stress is a stress at an elongation of 10%, and the measuring method thereof will be described later.

The maximum stress of the paint film is preferably 10.0 MPa or more, and more preferably 12.0 MPa or more, and even more preferably 14.5 MPa or more, and is preferably 50 MPa or less, more preferably 45 MPa or less, and even more preferably 40 MPa or less. If the maximum stress is 10.0 MPa or more, the paint film is not excessively soft, and the adhesion to the surface of the golf ball body is enhanced. If the maximum stress is 50 MPa or less, the paint film is not excessively hard, and the paint film is unlikely to be cracked when the painted golf ball is hit. In other words, the adhesion to the surface of the golf ball body is enhanced. The maximum stress is a maximum stress in a stress-strain curve obtained through the measurement in a tensile test. The maximum stress may be a maximum stress in the stress-strain curve. For example, when a stress observed at a yield point in the stress-strain curve is maximum, the yield stress is regarded as the maximum stress, and if a stress observed when the paint film is broken is maximum, the stress at break is regarded as the maximum stress. The measurement condition in the tensile test will be described later.

The elongation at break of the paint film is preferably 85% or more, and more preferably 90% or more, and even more preferably 95% or more, and is preferably 300% or less, and more preferably 290% or less, and even more preferably 280% or less. If the elongation at break is 85% or more, the paint film is not excessively hard, and the paint film is unlikely to be cracked when the painted golf ball is hit. In other words, the adhesion to the surface of the golf ball body is enhanced. If the elongation at break 300% or less, the paint film is not excessively soft, and the adhesion to the surface of the golf ball body is enhanced. The elongation at break is an elongation at the moment when the paint film is broken while stretching the paint film.

The viscosity of the aqueous golf ball paint of the present invention is preferably 50 mPa·s or more, more preferably 60 mPa·s or more, even more preferably 70 mPa·s or more, and is preferably 350 mPa·s or less, more preferably 340 mPa·s or less, 330 mPa·s or less. If the viscosity is 50 mPa·s or more, the paint applied on the surface of the golf ball body does not sag, and the paint film having the even thickness to the higher extent can be obtained, and if the viscosity is 350 mPa·s or less, spraying becomes good and thus, the appearance (gloss) of the painted golf ball becomes better in the case of spraying the paint with an air gun. The method of measuring the viscosity of the two-component curing type urethane-based aqueous paint will be described later.

A method for measuring the contact angle of the paint to an ionomer resin, the viscosity of the paint, the reflectivity of the paint film at the incident angle of 20°, the 10% stress and the maximum stress, and the elongation at break of the paint film will be described below.

First, the two-component curing type urethane-based aqueous golf ball paint used in the present invention will be described. The two-component curing type urethane-based aqueous paint used in the present invention forms a paint film by generating a polyurethane through curing reaction between (A) the aqueous polyol composition and (B) the aqueous polyisocyanate. In the present invention, the term "aqueous" used herein includes both "water-soluble" and "water-dispersible."

(A) The aqueous polyol composition contains (a-1) an aqueous acrylic polyol, (a-2) an aqueous urethane polyol, and (a-3) an aqueous urethane resin.

(a-1) The aqueous acrylic polyol is an acrylic polyol, which is modified to be aqueous.

The acrylic polyol has, without any limitation, for example, at least two hydroxyl groups in one molecule and is obtained by copolymerizing a (meth)acrylic monomer having a hydroxyl group and a (meth)acrylic monomer having no hydroxyl group.

Examples of the (meth)acrylic monomer having a hydroxyl group include (meth)acrylic acid esters having a hydroxyl group, such as 2-hydroxyethyl(meth)acrylate, 2-hydroxypropyl(meth)acrylate, 2-hydroxybutyl(meth)acrylate, alkylene glycol mono(meth)acrylate, and polyalkylene glycol mono(meth)acrylate. These (meth)acrylic monomers having a hydroxyl group may be used individually or in combination of two or more of them.

Examples of the (meth)acrylic monomer having no hydroxyl group include: (meth)acryl-based unsaturated carboxylic acids such as (meth)acrylic acid; (meth)acrylic acid ester such as methyl (meth)acrylate, ethyl(meth)acrylate, propyl(meth)acrylate, isopropyl(meth)acrylate, butyl(meth)acrylate, isobutyl(meth)acrylate, pentyl(meth)acrylate, hexyl (meth)acrylate, 2-ethylhexyl(meth)acrylate, cyclohexyl (meth)acrylate, octyl(meth)acrylate, and decyl(meth)acrylate; and another (meth)acrylic monomer such as (meth)acrylonitrile, and (meth)acrylamide. These (meth)acrylic monomers having no hydroxyl group may be used individually or in combination of two or more of them. In the present invention, (meth)acrylic acid means acrylic acid and/or methacrylic acid.

Further, in addition to the (meth)acrylic monomer, the acrylic polyol may contain another monomer component which has a hydroxyl group and/or another monomer component which has no hydroxyl group, as long as they do not impair the effects of the present invention. Examples of another monomer component which has a hydroxyl group include unsaturated alcohols such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component which has no hydroxyl group include: aromatic vinyl compounds such as styrene and α-methyl styrene; and ethylenically unsaturated carboxylic acids such as maleic acid and itaconic acid. These other monomer components may be used individually or in combination of two or more of them.

A method for modifying the acrylic polyol to be aqueous includes, without any limitation, for example, a method in which a monomer such as an unsaturated carboxylic acid having a carboxyl group like (meth)acrylic acid and maleic acid is copolymerized, and the carboxyl group is neutralized with a base, thereby modifying the acrylic polyol to be aqueous, or a method in which a (meth)acrylic monomer having a hydroxyl group is subjected to the emulsion-polymerization in the presence of an emulsifier, thereby modifying the acrylic polyol to be aqueous.

The hydroxyl value of (a-1) the aqueous acrylic polyol is preferably 50 mg KOH/g or more, and more preferably 60 mg KOH/g or more, and even more preferably 70 mg KOH/g or more, and is preferably 150 mg KOH/g or less, and more preferably 140 mg KOH/g or less, and even more preferably 130 mg KOH/g or less. If the hydroxyl value of (a-1) the aqueous acrylic polyol falls within the above range, the gloss of the paint film can be further improved. In addition, the hardness and water-resistance of the paint film can be improved. In the present invention, the hydroxyl value can be measured by using, for example, an acetylization method, in accordance with JIS K 1557-1.

The glass transition temperature of (a-1) the aqueous acrylic polyol is preferably 20° C. or more, and more preferably 22° C. or more, and even more preferably 25° C. or more, and is preferably 60° C. or less, and more preferably 57° C. or less, and even more preferably 55° C. or less. If the glass transition temperature of (a-1) the aqueous acrylic polyol falls within the above range, the production of the aqueous paint becomes easy. Further, the impact-resistance of the paint film can be enhanced.

The weight average molecular weight of (a-1) the aqueous acrylic polyol is preferably 3,000 or more, and more preferably 5,000 or more, and even more preferably 8,000 or more, and is preferably 50,000 or less, and more preferably 45,000 or less, and even more preferably 40,000 or less. If the weight average molecular weight of (a-1) the aqueous acrylic polyol falls within the above range, the water-resistance and impact-resistance of the paint film can be enhanced. The weight average molecular weight of (a-1) the aqueous acrylic polyol can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K. K.).

Further, the average number (average hydroxyl group number) of hydroxyl groups contained in a molecule of (a-1) the aqueous acrylic polyol is preferably 5 or more, and more preferably 10 or more, and even more preferably 20 or more, and is preferably 100 or less, and more preferably 50 or less, and even more preferably 40 or less. If the average hydroxyl group number of (a-1) the aqueous acrylic polyol is 5 or more, because of the high reactivity with (B) the aqueous polyisocyanate, a tough paint film can be formed and the adhesion to the surface of the golf ball body becomes better. If the average hydroxyl group number is 100 or less, the water-resistance of the paint film formed becomes good. It is noted that the average hydroxyl group number of (a-1) the aqueous acrylic polyol can be calculated based on the hydroxyl value and the weight average molecular weight.

(a-1) The aqueous acrylic polyol is preferably used in the form of an aqueous liquid in which (a-1) the aqueous acrylic polyol is dissolved or dispersed in water. For example, when the aqueous liquid in which (a-1) the aqueous acrylic polyol is dissolved or dispersed in water is used, the content (non-volatile content) of (a-1) the aqueous acrylic polyol component in the aqueous liquid is preferably 20 mass % or more, more preferably 25 mass % or more, even more preferably 30 mass % or more, and is preferably 70 mass % or less, more preferably 65 mass % or less, and even more preferably 60 mass % or less. If the content of (a-1) the aqueous acrylic polyol component in the aqueous liquid falls within the above range, (a-1) the aqueous acrylic polyol can be easily mixed with (a-2) the aqueous urethane polyol or the like, thereby facilitating the preparation of (A) the aqueous polyol composition. A method for measuring the non-volatile content will be described later.

Specific examples of (a-1) the aqueous acrylic polyol include an aqueous acrylic polyol (hydroxyl value: 108 mg KOH/g, glass transition temperature: 46° C.) available from SHINTO PAINT CO., LTD., and trade names "Bayhydrol (registered trademark) VPLS2058", "Bayhydrol (registered trademark) VPLS2235", "Bayhydrol (registered trademark) XP2470", available from Sumika Bayer Urethane Co., Ltd.

Next, (a-2) the aqueous urethane polyol contained in (A) the aqueous polyol composition will be described.

(a-2) The aqueous urethane polyol is an aqueous compound having a plurality of urethane bonds in its molecule, and having at least two hydroxyl groups in a molecule thereof. (a-2) The aqueous urethane polyol is, for example, a hydroxyl group terminated urethane prepolymer, which is obtained by reaction between a polyisocyanate component and an aqueous polyol component such as an aqueous polyester polyol and an aqueous polyether polyol, under a condition that the hydroxyl groups of the aqueous polyol component is excessive to the isocyanate groups of the polyisocyanate component.

The aqueous polyester polyol which can constitute (a-2) the aqueous urethane polyol may be any one of a water-soluble polyester polyol or a water-dispersible polyester polyol. For example, a polyester polyol having a carboxyl group, a polyester polyol having a sulfonic group, and the like may be used as the aqueous polyester polyol. As the aqueous polyester polyol, an aqueous polyester polyol having a carboxyl group is particularly preferable, and is modified to be aqueous by neutralizing the carboxyl group thereof with a base.

The aqueous polyester polyol having a carboxyl group may be synthesized in a known method for synthesizing a polyester polyol, and can be obtained through, for example, polycondensation of a low molecular weight polyol and a polybasic acid. Further, the carboxyl group used for modifying the polyester polyol to be aqueous can be introduced from any one of the low molecular weight polyol or the polybasic acid.

The low molecular weight polyol may be any polyol publicly known for being used in the synthesis of polyester polyols, and examples thereof include: diols such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexanediol, bisphenol A; and triols such as trimethylol propane and glycerin. Examples of the low molecular weight polyol for introducing the carboxyl group in the polyester polyol include dimethylol propionic acid, dimethylol butanoic acid, dihydroxy propionic acid, and dihydroxysuccinic acid. These low molecular weight polyols may be used individually or in combination of two or more types thereof.

The polybasic acid may be any polybasic acid publicly known for being used in the synthesis of polyester polyols, and examples thereof include dibasic acids such as succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, 1,4-naphthalenedicarboxylic acid, 2,5-naphthalenedicarboxylic acid, 2,6-naphthalenedicarboxylic acid, naphthalic acid, and biphenyldicarboxylic acid. Examples of the polybasic acid for introducing the carboxyl group in the polyester polyol include trimellitic anhydride, and pyromellitic anhydride. These polybasic acids may be used individually or in combination of two or more types thereof.

The aqueous polyether polyol component which can constitute (a-2) the aqueous urethane polyol is, for example, polyethylene glycol. The aqueous polyether polyol is modified to be aqueous by simply mixing it with water and stirring them. Further, the polyether polyol may be dissolved while being heated, as necessary.

The polyisocyanate component which can constitute (a-2) the aqueous urethane polyol is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylene-diisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

The hydroxyl value of (a-2) the aqueous urethane polyol is preferably 50 mg KOH/g or more, more preferably 60 mg KOH/g or more, even more preferably 70 mg KOH/g or more, and is preferably 500 mg KOH/g or less, more preferably 450 mg KOH/g or less, 400 mg KOH/g or less. If the hydroxyl value of (a-2) the aqueous urethane polyol falls within the above range, it would be possible to further improve the adhesion of the paint film to the golf ball body.

The weight average molecular weight of (a-2) the aqueous urethane polyol is preferably 200 or more, and more preferably 250 or more, and even more preferably 300 or more, and is preferably 50,000 or less, and more preferably 45,000 or less, and even more preferably 40,000 or less. If the weight average molecular weight of (a-2) the aqueous urethane polyol falls within the above range, the water-resistance and impact-resistance of the paint film can be enhanced. The weight average molecular weight of (a-2) the aqueous urethane polyol can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K. K.).

Further, the average number of hydroxyl groups (average hydroxyl group number) contained in one molecule of (a-2) the aqueous urethane polyol is preferably 1.0 or more, more preferably 1.5 or more, even more preferably 2 or more, and is preferably 50 or less, and more preferably 45 or less, and even more preferably 40 or less. If the average number of hydroxyl group of (a-2) the aqueous urethane polyol is 1.0 or more, reactivity to (B) the aqueous polyisocyanate is high and thus a tough paint film can be formed and the adhesion to the surface of the golf ball body becomes better. If the average hydroxyl group number is 50 or less, the water-resistance of the paint film formed becomes better. The average hydroxyl group number of (a-2) the aqueous urethane polyol can be calculated based on the hydroxyl value and the weight average molecular weight.

(a-2) The aqueous urethane polyol is preferably used in the form of an aqueous liquid in which (a-2) the aqueous urethane polyol is dissolved or dispersed in water. For example, if an aqueous liquid in which (a-2) the aqueous urethane polyol is dissolved or dispersed in water is used, the content (non-volatile content) of (a-2) the aqueous urethane polyol component in the aqueous liquid is preferably 20 mass % or more, more preferably 23 mass % or more, even more preferably 25 mass % or more, and is preferably 95 mass % or less, more preferably 93 mass % or less, even more preferably 90 mass % or less. If the content of (a-2) the aqueous urethane polyol component in the aqueous liquid falls within the above range, (a-2) the aqueous urethane polyol can be easily mixed with (a-1) the aqueous acrylic polyol or the like, thereby facilitating the preparation of (A) the aqueous polyol composition. A method for measuring the non-volatile content will be described later.

Specific examples of the aqueous liquid of (a-2) the aqueous urethane polyol include trade names "FLEXOREZ (registered trademark) UD-350W" and "FLEXOREZ (registered trademark) UD-320" available from King Industries, Inc., and trade name "Bayhydrol (registered trademark) VPLS2056" available from Sumika Bayer Urethane Co., Ltd.

Next, (a-3) the aqueous urethane resin contained in (A) the aqueous polyol composition will be described.

(a-3) The aqueous urethane resin is a polyurethane resin which is modified to be aqueous.

The polyurethane resin is not particularly limited, as long as it has a plurality of urethane bonds within the molecule. For example, the polyurethane resin can be obtained by reacting a polyisocyanate component with a high molecular weight polyol component to have urethane bonds formed within the molecule. Further, a chain extension reaction with a low molecular weight polyol, a low molecular weight polyamine, or the like is performed if necessary Examples of the polyisocyanate component which can constitute the polyurethane resin, include polyisocyanates exemplified as being used for (a-2) the aqueous urethane polyol.

The polyol component constituting the polyurethane resin may be, without any limitation, any polyol component having a plurality of hydroxyl groups. For example, a low molecular weight polyol having a molecular weight of less than 500, or a high molecular weight polyol having a molecular weight of 500 or more may be used as the polyol component.

Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylol propane, and hexane triol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. Among them, the polyol having a weight average molecular weight of about 50 to about 2,000, in particular about 100 to about 1,000 is preferably used. The above polyols may be used alone or as a mixture of at least two of them.

The polyamine component that constitutes the polyurethane resin where necessary may include any polyamine, as long as it has at least two amino groups. The polyamine component includes an aliphatic polyamine such as ethylenediamine, propylenediamine, and hexamethylenediamine, an aromatic polyamine such as tolylenediamine, xylylenediamine, and diaminodiphenyl methane; and an alicyclic polyamine such as diaminocyclohexyl methane, piperazine, isophoronediamine; hydrazine or derivatives thereof such as succinic acid dihydrazide, adipic acid dihydrazide, phthalic acid dihydrazide. As the low molecular weight polyol or low molecular weight polyamine, alkanolamine such as diethanolamine, monoethanolamine can be used.

The polyurethane resin has no limitation on the constitutional embodiments thereof. Examples of the constitutional embodiments are the embodiment where the polyurethane resin consists of the polyisocyanate component and the high-molecular weight polyol component; the embodiment where the polyurethane resin consists of the polyisocyanate component, the high-molecular weight polyol component and the low-molecular weight polyol component; and the embodiment where the polyurethane resin consists of the polyisocyanate component, the high-molecular weight polyol component, the low-molecular weight polyol component, and the polyamine component; and the embodiment where the polyurethane resin consists of the polyisocyanate component, the high-molecular weight polyol component and the polyamine component.

As a method for modifying the polyurethane resin to be aqueous, for example, an ionomer type self-emulsification method or a prepolymer emulsification type phase inversion emulsification method may be used.

In the ionomer type self-emulsification method, the polyurethane resin is dissolved or dispersed in water, without using an emulsifier, by introducing an ionic group in a molecule of the polyurethane resin. The ionic group includes functional groups such as a carboxyl group or an amino group which can be ionized (but not yet ionized) and ionized functional groups where the ionizable functional group is neutralized with an inorganic metal compound or amines.

As a method for introducing the ionic group in a molecule of the polyurethane resin, a known method can be employed. For example, a method in which a polyol having an ionic group is used as a part of the polyol component, a method in which a chain extender having an ionic group is used as a part or the whole of the chain extender components, or a method in which the polyol and the chain extender each having an ionic group are used as a part of the polyol component and a part or the whole of the chain extender components, respectively, may be employed.

The polyol having the ionic group includes, for example, a polyester polyol having a carboxyl group or a polyester polyol having a sulfonic group, which are exemplified as polyols used for (a-2) the aqueous urethane polyol. Examples of the chain extender having the ionic group include low molecular weight polyols such as dimethylol propionic acid, dimethylol butanoic acid, dihydroxy propionic acid, and dihydroxysuccinic acid.

In the prepolymer emulsification type phase inversion emulsification method, a relatively low molecular weight urethane prepolymer is forced to be emulsified and dispersed by a high shear in the presence of a non-ionic emulsifier, and is thereafter subjected to chain extension reaction with a polyol component or a low molecular weight polyamine component.

Each of (a-3) the aqueous urethane resin and (a-2) the aqueous urethane polyol has a plurality of urethane bonds in its molecule. (a-2) The aqueous urethane polyol has at least two hydroxyl groups in one molecule, whereas (a-3) the aqueous urethane resin substantially has no hydroxyl group. That is, a hydroxyl value of (a-3) the aqueous urethane resin is less than or equal to 5 mg KOH/g.

The glass transition temperature of (a-3) the aqueous urethane resin is preferably 20° C. or less, more preferably 15° C. or less, and even more preferably 10° C. or less. If the glass transition temperature of (a-3) the aqueous urethane resin is 20° C. or less, the elongation of the aqueous urethane resin is increased, and the tensile property of the paint film is enhanced. The lower limit of the glass transition temperature of (a-3) the aqueous urethane resin is not limited, but may be −50° C. The glass transition temperature of (a-3) the aqueous urethane resin can be measured by using, for example, a dynamic viscoelasticity measurement apparatus.

The elongation of (a-3) the aqueous urethane resin is preferably 100% or more, and more preferably 150% or more, and even more preferably 200% or more, and is preferably 2,000% or less, more preferably 1,900% or less, and even more preferably 1,800% or less. If the elongation of (a-3) the aqueous urethane resin falls within the above range, the adhesion of the paint film to the surface of a golf ball body can be enhanced. The upper limit of the elongation of (a-3) the aqueous urethane resin is not limited, but may be 2,500%. The elongation of (a-3) the aqueous urethane resin can be measured by using, for example, Autograph available from SHIMADZU CORPORATION.

In the present invention, the glass transition temperature and the elongation of (a-3) the aqueous urethane resin are physical property values of the film obtained from (a-3) the aqueous urethane resin, and the measurement methods will be described later.

If a water-dispersible urethane resin is used as (a-3) the aqueous urethane resin, the volume average particle diameter of the urethane resin is preferably 50 nm or more, more preferably 55 nm or more, and even more preferably 60 nm or more, and is preferably 300 nm or less, more preferably 250 nm or less, and even more preferably 200 nm or less. If the volume average particle diameter of the dispersed urethane resin falls within the above range, the gloss of the paint film can be enhanced. The volume average particle diameter of the urethane resin dispersed in water can be measured by using a laser diffraction/scattering type particle size distribution measurement apparatus.

(a-3) The aqueous urethane resin is preferably used in the form of an aqueous liquid in which (a-3) the aqueous urethane resin is dissolved or dispersed in water. For example, when an aqueous liquid in which (a-3) the aqueous urethane resin is dissolved or dispersed in water is used, the content (non-volatile content) of (a-3) the aqueous urethane resin component in the aqueous liquid is preferably 10 mass % or more, more preferably 12 mass % or more, and even more preferably 15 mass % or more, and is preferably 50 mass % or less, more preferably 47 mass % or less, and even more preferably 45 mass % or less. When the content of (a-3) the aqueous urethane resin component in the aqueous liquid falls within the above range, (a-3) the aqueous urethane resin can be easily mixed with (a-1) the aqueous acrylic polyol or the like, thereby facilitating the preparation of (A) the aqueous polyol composition. A method for measuring the non-volatile content will be described later.

Specific examples of (a-3) the aqueous urethane resin include trade names "SUPERFLEX (registered trademark) 300" and "SUPERFLEX (registered trademark) 500H" available from Dai-ichi Kogyo Seiyaku Co., Ltd, and trade names "Bayhydrol (registered trademark) 124" available from Sumika Bayer Urethane Co., Ltd.

The content of (a-3) the aqueous urethane resin in (A) the aqueous polyol composition is preferably 20 mass % or more, more preferably 25 mass % or more, and even more preferably 30 mass % or more, and is preferably 80 mass % or less, more preferably 75 mass % or less, and even more preferably 70 mass % or less. If the content of (a-3) the aqueous urethane resin in (A) the aqueous polyol composition falls within the above range, the adhesion of the paint film to the surface of a golf ball body can be enhanced.

Further, as the blending ratio of (a-1) the aqueous acrylic polyol to (a-2) the aqueous urethane polyol in (A) the aqueous polyol composition (when the total is 100% by mass), the blending ratio of (a-1) the aqueous acrylic polyol/(a-2) the aqueous urethane polyol is preferably 40 mass % to 90 mass %/60 mass % to 10 mass %, more preferably 45 mass % to 85 mass %/55 mass % to 15 mass %, and even more preferably 50 mass % to 80 mass %/50 mass % to 20 mass %. If the blending ratio (a-1)/(a-2) falls within the above range, the gloss of the paint film which is obtained from the two-component curing type urethane-based aqueous paint of the present invention, the adhesion thereof to the golf ball body, and the durability thereof can be enhanced.

(A) The aqueous polyol composition preferably contains water as a dispersion medium. In this case, the non-volatile content in (A) the aqueous polyol composition is preferably 20 mass % or more, more preferably 25 mass % or more, and even more preferably 30 mass % or more, and is preferably 85 mass % or less, more preferably 80 mass % or less, and even more preferably 75 mass % or less. If the non-volatile content in (A) the aqueous polyol composition is 20 mass % or more, reactivity between (A) the aqueous polyol composition and (B) the aqueous polyisocyanate described below becomes good. Further, if the non-volatile content in (A) the aqueous polyol composition is 85 mass % or less, the viscosity is not excessively high, and the painting becomes good. A method for measuring the non-volatile content will be described below.

(B) The aqueous polyisocyanate will be described. (B) The aqueous polyisocyanate is not limited, as long as it is any modified product obtained by modifying the polyisocyanate component to be aqueous (water-soluble, or water-dispersible). For example, (B) the aqueous polyisocyanate may be an aqueous polyisocyanate obtained by modifying a polyisocyanate component with polyoxyalkylene ether alcohol.

The polyisocyanate component constituting the aqueous polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate(TMXDI) and para-phenylene diisocyanate (PPDI); and an alicyclic or aliphatic polyisocyanate such as 4,4'-dicyclohexylmethane diisocyanate ($H_{12}$MDI), hydrogenated xylylenediisocyanate($H_6$XDI) hexamethylene diisocyanate (HDI), isophorone diisocyanate (IPDI), norbornene diisocyanate (NBDI) and derivatives thereof.

Examples of the derivative of the polyisocyanate include: isocyanurate of diisocyanate; an adduct obtained through reaction between a diisocyanate and a low molecular weight triol such as trimethylolpropane or glycerin (it is preferable that a free diisocyanate is removed); an allophanate-modified product; and a biuret-modified product. One example of the allophanate-modified product is a trifunctional polyisocyanate which is obtained by further reacting a diisocyanate with a urethane bond formed through a reaction between a diisocyanate and a low molecular weight diol. One example of the biuret-modified products is a trifunctional polyisocyanate which is obtained by further reacting a diisocyanate with a urea bond formed through a reaction between a diisocyanate and a low molecular weight diamine. The polyisocyanates and the derivatives thereof may be used individually or in combination of two or more types.

(B) The aqueous polyisocyanate preferably contains, as a polyisocyanate component, (b-1) hexamethylene diisocyanate and/or a derivative thereof, and (b-2) isophorone diisocyanate and/or a derivative thereof. (B) The aqueous polyisocyanate more preferably consists of (b-1) hexamethylene diisocyanate and/or a derivative thereof and (b-2) isophorone diisocyanate and/or a derivative thereof. This combination enhances the weather-resistance of the paint film obtained from the two-component curing type urethane-based aqueous paint of the present invention.

As (b-1) the hexamethylene diisocyanate and/or a derivative thereof, an isocyanurate of hexamethylene diisocyanate is preferable. Further, as (b-2) the isophorone diisocyanate and/or a derivative thereof, an isocyanurate of isophorone diisocyanate is preferable.

As the blending ratio of (b-1) the hexamethylene diisocyanate and/or a derivative thereof, to (b-2) the isophorone diisocyanate and/or a derivative thereof in (B) the aqueous polyisocyanate (when the total is 100% by mass), the blending ratio of (b-1) the hexamethylene diisocyanate and/or a derivative thereof/(b-2) the isophorone diisocyanate and/or a derivative thereof is preferably 50 mass % to 99 mass %/50 mass % to 1 mass %, more preferably 55 mass % to 95 mass %/45 mass % to 5 mass %, and even more preferably 60 mass % to 90 mass %/40 mass % to 10 mass %. If the blending ratio ((b-1)/(b-2)) falls within the above range, the adhesion of the paint film obtained from the two-component curing type urethane-based aqueous paint of the present invention to a golf ball body, and the durability thereof can be enhanced.

Specific examples of (B) the aqueous polyisocyanate include trade name "CR-60N" available from DIC Corporation, trade names "CORONATE (registered trademark) C3062, C3053" available from NIPPON POLYURETHANE INDUSTRY CO., LTD., trade names "Bayhydur (registered trademark) 3100" and "Bayhydur (registered trademark) 401-70" available from Sumika Bayer Urethane Co., Ltd., trade name "1-3" available from SHINTO PAINT CO., LTD., and trade name "WG-6B" available from Wayaku Paint Co., Ltd.

In the two-component curing type urethane-based aqueous paint according to the present invention, the molar ratio (NCO/OH) of the isocyanate group (NCO) of (B) the aqueous polyisocyanate to the hydroxyl group (OH) of (A) the aqueous polyol composition is preferably 1.25 or more, more preferably 1.30 or more, and is preferably 2.50 or less, more preferably 2.40 or less. If the molar ratio (NCO/OH) is less than 1.25, the amount of the isocyanate groups is too small, and leveling effect cannot be obtained. Therefore, the appearance of the obtained paint film may deteriorate. Further, if the molar ratio (NCO/OH) is more than 2.50, the amount of the isocyanate groups is excessive, and the appearance of the obtained paint film may deteriorate as well as the obtained paint film may be hard and fragile. The appearance of the obtained paint film deteriorates because an excessive amount of isocyanate groups in the paint may promote a reaction between the moisture and the isocyanate groups, thereby generating a lot of carbon dioxide gas.

The two-component curing type urethane-based aqueous paint of the present invention may contain, in addition to the components described above, additives, such as a pigment, an ultraviolet absorber, an antioxidant, a light stabilizer, a fluorescent brightener, an anti-blocking agent, a leveling agent, a slip agent, and a viscosity modifier, which are generally contained in the paint for a golf ball, as necessary.

The leveling agent, without any limitation, may be any one which can be generally used for an aqueous paint. As the leveling agent, a silicone-based leveling agent, a fluorine-based leveling agent, an acrylic leveling agent, or the like may be used. Among them, a silicone-based leveling agent is preferable.

Specific examples of the leveling agent include: trade names "BYK (registered trademark)-307" and "BYK (registered trademark)-333", commercially available from BYK Japan KK, which correspond to polyether-modified polydimethylsiloxane; trade names "BYK (registered trademark)-345", "BYK (registered trademark)-346", "BYK (registered trademark)-347", and "BYK (registered trademark)-348", commercially available from BYK Japan KK, which correspond to polyether-modified siloxane; trade names "SN-Wet 125" and "SN-Wet 126", commercially available from San Nopco Limited, which correspond to silicone-based leveling agents; trade names "POLYFLOW KL-245" and "POLYFLOW KL-260", commercially available from Kyoeisha Chemical Co., Ltd., which correspond to modified silicones; and trade names "EFKA (registered trademark) 3522", "EFKA (registered trademark) 3523, and "EFKA (registered trademark) 3580", commercially available from Ciba Specialty Chemicals Corporation, which correspond to modified polysiloxane.

When the leveling agent is used, the amount of the leveling agent in the two-component curing type urethane-based aqueous golf ball paint (including a solvent) is preferably 0.05 mass % or more, more preferably 0.10 mass % or more, and even more preferably 0.15 mass % or more, and is preferably 3 mass % or less, more preferably 2.5 mass % or less, and even more preferably 2.0 mass % or less. If the amount of the leveling agent is 0.05 mass % or more, a dried paint film is smooth, and the appearance of the painted golf ball obtained becomes better. If the amount of the leveling agent is 3 mass % or less, the dried paint film is not likely to have a defect like fish-eye, and the appearance of the painted golf ball obtained becomes better.

A method for applying the two-component curing type urethane-based aqueous golf ball paint according to the present invention is not limited, and a method which is well known for a method for applying two-component mixing type paint may be used. For example, a base material such as an aqueous liquid of (A) the aqueous polyol composition is mixed with a curing agent such as (B) an aqueous polyisocyanate, and the obtained mixture is applied to the golf ball with an air gun or by an electrostatic coating method. Further, the golf ball may be previously subjected to surface treatments such as cleaning or sandblast. In the case of applying the paint with the air gun, a base material such as an aqueous liquid of (A) an aqueous polyol composition and a curing agent such as (B) an aqueous polyisocyanate can be mixed little by little for use, or (A) an aqueous polyol composition and (B) an aqueous polyisocyanate are fed with the respective pumps and continuously mixed in a constant ratio through the line mixer such as the static mixer located in the stream line just before the air gun. Alternatively, (A) an aqueous polyol composition and (B) an aqueous polyisocyanate can be air-sprayed respectively with the spray gun having the device for controlling the mixing ratio thereof.

Further, when the paint is applied to the golf ball with an air gun, a manner (1) in which the surface of the golf ball body is heated, and thereafter the paint is applied to the golf ball, and a manner (2) in which the paint is overpainted to the golf ball multiple times while applying a small amount of the paint at one time until the paint film has a desired thickness, may be also preferably employed.

In the manner (1), when the paint is applied to the golf ball, the surface temperature of the golf ball body is preferably 35° C. or higher, more preferably 40° C. or higher, and even more preferably 45° C. or higher, and is preferably 90° C. or lower, more preferably 85° C. or lower, and even more preferably 80° C. or lower. The method of adjusting the temperature of the golf ball includes, without limitation, for example, putting the golf ball into the oven set at the predetermined temperature, irradiating microwaves, or irradiating infrared light. The surface temperature of the golf ball body when applying a paint can be measured with a contact type thermometer ("ERK-2000K" available from SANWAKEIKI SEISAKUSHO Co., LTD.) or an infrared thermography device ("Thermo tracer TH9100MV/WV" available from NEC Avio Infrared Technologies Co., Ltd.)

In the manner (2), the applied amount of the paint per one painting operation is preferably 50 mg or more, more preferably 60 mg or more, even more preferably 70 mg or more, and is preferably 160 mg or less, more preferably 150 mg or less, and even more preferably 140 mg or less. Further, the times for overpainting are not limited, as long as the times are at least two times, and may be changed appropriately depending upon a desired film thickness. For example, when the desired film thickness is 10 µm, it is particularly preferable that the times for overpainting are two times.

Subsequently, the two-component curing type urethane-based aqueous paint applied to the golf ball body is dried, for example, at a temperature ranging from 30° C. to 70° C. for 1 to 24 hours to form the paint film.

The thickness of the paint film after drying is preferably, without limitation, 4 µm or more, more preferably 5 µm or more, and is preferably 50 µm or less, more preferably 40 µm or less. If the thickness is less than 4 µm, the paint film is likely to wear off due to the continued use. If the thickness is more than 50 µm, the effect of the dimples is lowered, and thus the flying performance of the golf ball tends to be low. The paint film preferably has a single-layered structure. If the paint film has a single-layered structure, the process of applying the paint is simplified. In the present invention, the paint film shows the excellent property even if it has the single-layered structure. The paint film is preferably an outermost clear paint layer.

Next, the painted golf ball of the present invention will be explained.

The golf ball of the present invention is a painted golf ball that comprises a golf ball body and a paint film, wherein the paint film is formed from the two-component curing type urethane-based aqueous golf ball paint of the present invention.

The golf ball body does not have no limitation on the structure, and may be a one-piece golf ball, a two-piece golf ball, a multi-piece golf ball including a three-piece-golf ball, or a wound golf ball. The present invention can be applied appropriately to any one of the above golf ball. Among them, typically preferred are the one-piece golf ball made from a rubber composition containing a rubber component as a main component, and the golf balls having a core and a cover covering the core like a two-piece golf ball, a multi-piece golf ball, and a wound golf ball wherein the cover is formed from a resin composition containing an ionomer resin as a main component.

As the core or the one-piece golf ball body, a conventionally known rubber composition (hereinafter simply referred to as "core rubber composition" occasionally) may be employed, and they can be molded by, for example, heat-pressing a rubber composition containing a diene rubber as a base rubber, a crosslinking initiator, and a co-crosslinking agent.

The rubber composition preferably contains a rubber component. That is, the content of the base rubber in the rubber composition is preferably 50 mass % or more. As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior repulsion property.

The co-crosslinking agent includes; for example, α,β-unsaturated carboxylic acid having 3 to 8 carbon atoms or a metal salt thereof, more preferably a metal salt of acrylic acid or methacrylic acid. As the metal constituting the metal salt, for example, zinc, magnesium, calcium, aluminum and sodium may be used, and among them, zinc is preferred. The amount of the co-crosslinking agent to be used is preferably 20 parts or more, and is preferably 50 parts or less. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 1.5 parts by mass or less, more preferably 1.0 parts by mass or less based on 100 parts by mass of the base rubber. The core rubber composition may further contain an organic sulfur compound. As the organic sulfur compound, a diphenyl disulfide or a derivative thereof may be preferably used. The amount of the organic sulfur compound is preferably 0.1 part by mass or more, more preferably 0.3 part by mass or more, and preferably 5.0 parts by mass or less, more preferably 3.0 parts by mass or less relative to 100 parts by mass of the base rubber.

The core rubber composition may further contain a gravity adjusting agent such as zinc oxide or barium sulfate, an antioxidant, or a colored powder in addition to the base rubber, the crosslinking initiator, the co-crosslinking agent and the organic sulfur compound. The conditions for press-molding the core rubber composition should be determined appropriately depending on the rubber composition. The press-molding is preferably carried out for 10 to 60 minutes at the temperature of 130° C. to 200° C. or the press-molding is preferably carried out in a two-step heating, for example, for 20 to 40 minutes at the temperature of 130° C. to 150° C., and continuously for 5 to 15 minutes at the temperature of 160° C. to 180° C.

The cover in the wound golf balls, two-piece golf balls, and multi-piece golf balls will be explained.

The cover composition for forming the cover includes, for example, a rubber composition used for the one-piece golf ball, and a resin composition containing a resin component.

Examples of the resin component include, various resins such as an ionomer resin, a polyester resin, polyurethane resins like a thermoplastic urethane resin and a thermosetting urethane resin, and a polyamide resin; and various thermoplastic elastomers such as a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" available from BASF Japan Ltd, and a thermoplastic polystyrene elastomer having a trade name "Rabalon (registered trademark)(e.g. "Rabalon T3221C")" and a thermoplastic polyester elastomer having a trade name "Primalloy" commercially available from Mitsubishi Chemical Corporation, and the like. Among them, the resin component preferably contains an ionomer resin as a main component. That is, the content of the ionomer resin in the resin component is preferably 50 mass % or more. More preferably, the resin component consists of the ionomer resin.

Specific examples of the ionomer resin include trade name "Himilan (registered trademark) (e.g. Himilan 1555 (Na), Himilan 1557 (Zn), Himilan 1605 (Na), Himilan 1702 (Zn), Himilan 1706 (Zn), Himilan 1707 (Na), Himilan AM7311 (Mg), Himilan AM 7318 (Na), Himilan AM7329 (Zn), Himilan 1856 (Na), Himilan 1855 (Zn), and the like)" commercially available from Du Pont-Mitsui Polychemicals Co., Ltd.

Further, ionomer resins commercially available from E.I. du Pont de Nemours and Company include trade name "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); Surlyn 6320 (Mg), Surlyn 8120 (Na), Surlyn 8320 (Na), Surlyn 9320 (Zn), Surlyn 9320W (Zn) as a ternary copolymerized ionomer; and the like)", "HPF 1000 (Mg), HPF 2000 (Mg)", and the like.

Further, ionomer resins commercially available from ExxonMobil Chemical Corporation include trade name "Iotek (registered trademark) (e.g. Iotek 8000 (Na), Iotek 8030 (Na), Iotek 7010 (Zn), Iotek 7030 (Zn), and the like)". Examples of a ternary copolymerized ionomer are "Iotek 7510 (Zn), Iotek 7520 (Zn)" and the like.

It is noted that Na, Zn, Li, and Mg described in the parentheses after the trade names indicate metal types of neutralizing metal ions.

The cover composition forming the cover is preferably a rubber composition containing a rubber component as a main component; or a resin composition containing an ionomer resin as a main component of the resin component.

The cover in the present invention may contain a pigment component such as a white pigment (titanium oxide), a blue pigment, a red pigment, and the like, a specific gravity adjusting agent such as zinc oxide, calcium carbonate, barium sulfate, and the like, a dispersant, an antioxidant, an ultraviolet absorber, a light stabilizer, a fluorescent material or a fluorescent brightener, and the like as long as they do not impair the performance of the cover.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

The molding temperature means the highest temperature where the temperature at the surface of the concave portion of the lower mold reaches from closing through opening the molds. Further, the flow beginning temperature of the cover material can be measured in a pellet form with the following conditions by using a flow characteristics evaluation apparatus (Flow Tester CFT-500D, manufactured by Shimadzu Corporation).

Measuring conditions: Area size of a plunger: 1 $cm^2$, Die length: 1 mm, Die diameter: 1 mm, Load: 588.399 N, Start temperature: 30° C., and Temperature increase rate: 3° C./min.

When molding a cover, the concave portions called "dimple" are usually formed on the surface. The total number of the dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them. After the cover is molded, the mold is opened and the golf ball body is taken out from the mold, and as necessary, the golf ball body is preferably subjected to surface treatments such as deburring, cleaning, and sandblast. If desired, a paint film or a mark may be formed.

In the case that the golf ball of the present invention is a multi-piece golf ball including a three-piece golf ball, the material for the intermediate layer disposed between the core and the cover includes a thermoplastic resin such as a polyurethane resin, an ionomer resin, a polyamide resin, and polyethylene; and a thermoplastic elastomer such as a polystyrene elastomer, a polyolefin elastomer, a polyurethane elastomer, a polyester elastomer; and a cured product of a rubber composition. Herein, examples of the ionomer resin include one prepared by neutralizing at least a part of carboxyl groups in a copolymer composed of ethylene and α,β-unsaturated carboxylic acid with a metal ion, and one prepared by neutralizing at least a part of carboxyl groups in a terpolymer composed of ethylene, α,β-unsaturated carboxylic acid and α,β-unsaturated carboxylic acid ester with a metal ion. The intermediate layer may further contain a specific gravity adjusting agent such as barium sulfate, tungsten and the like, an antioxidant, and a pigment.

Examples

Hereinafter, the present invention will be described in detail by way of example. The present invention is not limited to examples described below. Various changes and modifications can be made without departing from the spirit and scope of the present invention.

[Evaluation Methods]

(1) Contact Angle 0.03 ml of a two-component curing type urethane-based aqueous paint was dripped onto a test plate. After 30 seconds passed from the dripping, a contact angle of the droplet was measured by using an automatic liquid crystal glass processing test apparatus ("LCD-400S" available from Kyowa Interface Science Co., Ltd.).

As the test plate, a plate formed of a resin component (resin component of a cover composition) for forming an outermost layer of a golf ball body, an ionomer plate, and a rubber composition plate were used. Each test plate was produced in the following manner.

A Plate Formed of a Resin Component for Forming an Outermost Layer of a Golf Ball Body The test plate was produced by press molding using a resin component of a cover composition for forming a cover or a rubber composition for forming a golf ball body.

Ionomer Plate

"Surlyn (registered trademark) 8945" available from E.I. du Pont de Nemours and Company, and "Himilan (registered trademark) AM7329" available from Du Pont-Mitsui Polychemicals Co., Ltd. were mixed with each other at a ratio of 50 to 50 (by mass) by using a twin-screw kneading extruder to prepare a pellet, and the pellet was melted at 160° C., and press-molded to form the ionomer plate.

Rubber Composition Plate

The rubber composition having the formulation shown in Table 1 was press-molded at 170° C. for 20 minutes to form a plate having the thickness of 2 mm.

(2) Reflectivity at an Incident Angle of 20 Degrees

The two-component curing type urethane-based aqueous golf ball paint was applied to a glass plate as a test plate at room temperature by using an air gun (primary pressure: 2 kg f/m$^2$ to 3 kgf/m$^2$), and the paint was dried at 23° C. for 24 hours, and formed into a paint film having a thickness of 5 to 20 μm, to form a test piece.

The reflectivity (gloss level) of the paint film at the incident angle of 20° was measured for the obtained test piece by using a glossmeter ("MULTI GLOSS 268" available from KONICA MINOLTA HOLDINGS, INC.), in accordance with JIS K 5600.

(3) 10% Stress, Maximum Stress, and Elongation at Break

A film having a film thickness of 20 μm to 30 μm was produced by using the two-component curing type urethane-based aqueous golf ball paint. The condition for drying was 40° C. and 1 week. Subsequently, the obtained film was punched to form a test piece, and a rate of elongation was measured by using a precision universal testing machine (Autograph AG-5000A available from SHIMADZU CORPORATION). The measurement was performed under the condition that the length of the test piece was 20 mm and the tensile rate was 50 mm/min.

(4) Viscosity

The viscosity of the two-component curing type urethane-based aqueous golf ball paint was measured by using a single cylinder rotational viscometer ("Viscotester VT-04F" available from Riontech Co., Ltd). The measurement was performed by using a rotor No. 3, and the rotation speed of the rotor was 62.5 min$^{-1}$, and the measurement temperature was 25° C. The viscosity of the two-component curing type urethane-based aqueous paint according to the present invention was measured immediately after (A) the aqueous polyol composition and (B) the aqueous polyisocyanate (B) were mixed.

(5) Elongation of the Aqueous Urethane Resin

An aqueous urethane resin was used to produce a film having a film thickness of 500 μm. Drying was performed under the condition that preliminary drying was performed at room temperature for 15 hours, and final drying was performed at 80° C. for 6 hours, and at 120° C. for 20 minutes. Subsequently, the obtained film was stamped out to form a test piece, and the elongation was measured with a Tensilon universal material testing Instrument. The measurement was performed under the condition that the length of the test piece was 30 mm and the crosshead speed was 200 mm/min.

(6) Glass Transition Temperature

The glass transition temperature of the aqueous acrylic polyol was measured by using a differential scanning calorimeter (DSC) ("Q200" available from TA Instruments Inc.). The measurement was performed under the condition of the measurement temperature range: −50° C. to 200° C. and the temperature increase rate: 20° C./min.

The glass transition temperature of the aqueous urethane resin was measured by using a dynamic viscoelasticity measuring apparatus (Rheogel-E4000 available from UBM Co., Ltd.). The measurement was performed under the conditions of the oscillation frequency: 10 Hz, the measurement temperature range: −100° C. to 200° C., and the temperature increase rate: 2° C./min. A film produced by using an aqueous urethane resin was used as a test sample. The drying was performed under the condition that preliminary drying was performed at room temperature for 15 hours, and final drying was performed at 80° C. for 6 hours and at 120° C. for 20 minutes.

(7) Non-Volatile Content

Approximately 2 g of a sample was put on an aluminum plate and was forced to be dried at 150° C. for 1 hour, and the non-volatile content was determined, based on the mass before drying and the mass after drying.

(8) Appearance of the Painted Golf Ball

The appearance of the painted golf ball was visually observed, and evaluated in accordance with the following evaluation criteria.

Evaluation Criteria

E(Excellent): a state in which the surface was very smooth and very glossy.

G(Good): a state in which the surface was smooth and glossy.

F(Fair): a state in which the surface was slightly uneven, and was not so glossy.

P(Poor): a state in which the surface was substantially uneven, and was not glossy.

(9) Evenness of the Film Thickness

A part of the surface of the painted golf ball was cut out to form a test piece (about 7 square millimeters) for observing the film thickness of the paint film. With respect to 6 dimples, the thicknesses of the paint film at the bottom and the edge, and a slope surface of each dimple were measured by using a microscope to obtain the respective averages, and the evaluation was made in accordance with the following evaluation criteria. Measuring points of the bottom and the edge, and the slope surface of each dimple will be described with reference to FIG. 1. FIG. 1 is a schematic diagram illustrating a cross-section including the bottom De of a dimple 10 and the center of a golf ball 2. The bottom De of the dimple is the deepest portion of the dimple 10. The edges Ed are tangent points at which the dimple 10 is tangent to a tangent line T which is drawn tangent to the farthest opposite ends of the dimple 10. A measurement point S on the slope surface is a point at which the slope surface of the dimple intersects the perpendicular line extending toward the dimple 10 from the center point of the straight line connecting between the bottom De and the edge Ed of the dimple.

Evaluation Criteria

The average of the film thicknesses at the bottoms of the dimples, the average of the film thicknesses at the edges of the dimples, and the average of the film thicknesses at the slope surfaces of the dimples are represented by x, y, and z, respectively.

E(Excellent): $|x-y| \leq 1.5$ μm and $|y-z| \leq 1.5$ μm and $|z-x| \leq 1.5$ μm G(Good): $|x-y| \leq 3$ μm and $|y-z| \leq 3$ μm and $|z-x| \leq 3$ μm P(Poor): $|x-y| > 3$ μm or $|y-z| > 3$ μm or $|z-x| > 3$ μm

(10) Adhesion of Paint Film

A metal-headed driver (W#1) was installed on a swing robot manufactured by True Temper Co. Each painted golf ball was repeatedly hit at a head speed of 45 m/s 50 times, and thereafter the peeling state of the paint film was observed, and the evaluation was made in accordance with the following evaluation criteria.

Evaluation Criteria

G(Good): An area in which the paint film peeled off was 1% or less with respect to the total area of the paint film.

F(Fair): An area in which the paint film peeled off was more than 1% and 5% or less with respect to the total area of the paint film.

P(Poor): An area in which the paint film peeled off more than 5% with respect to the total area of the paint film.

[Production of Golf Ball Body A]

(1) Preparation of Solid Core

The rubber composition shown in Table 1 was kneaded and heat-pressed with upper and lower molds each having a spherical cavity at the heating condition of 160° C. for 13 minutes to obtain the solid core in a spherical shape having a diameter of 39.3 mm.

(2) Preparation of the Cover Material

The blending materials shown in Table 1 were mixed using a twin-screw kneading extruder to obtain the cover composition in the form of pellet. The extrusion was conducted in the following conditions: screw diameter=45 mm, screw revolutions=200 rpm, and screw L/D=35. The cover composition was heated to from 200° C. to 260° C. at the die position of the extruder.

TABLE 1

| | | | Golf ball body No. | |
| --- | --- | --- | --- | --- |
| | | | A | B |
| | | Structure | 2P | 1P |
| One-piece golf ball body or | Rubber composition | Polybutadiene | 100 | 100 |
| | | Zinc oxide | 5.6 | 24 |
| | | Methacrylic acid | — | 24 |

TABLE 1-continued

| | | | Golf ball body No. | |
| --- | --- | --- | --- | --- |
| | | | A | B |
| Core | | Zinc acrylate | 22.0 | — |
| | | Calcium carbonate | 21.0 | — |
| | | Dicumyl peroxide | 1.85 | 0.5 |
| Cover | Cover composition | Resin component | Himilan 1605 | 40 | — |
| | | | Himilan 1706 | 30 | — |
| | | | Himilan 1707 | 30 | — |
| | | Titanium oxide | 2 | — |

Formulation: Parts by mass

Notes on Table 1:
Polybutadiene rubber: BR-51 (cis content:96%) available from JSR.
Zinc oxide: "Ginrei R" produced by Toho-Zinc.
Methacrylic acid: Methacrylic acid available from Mitsubishi Rayon Co., LTD.
Zinc acrylate: "ZNDA-90S" produced by NIHON JYORYU KOGYO.
Calcium carbonate: "BF300" produced by SHIRAISHI CALCIUM KAISHA, LTD
Dicumyl peroxide: "Percumyl D" produced by NOF Corporation.
HIMILAN 1605: an ionomer resin of a sodium ion-neutralized ethylene-methacrylic acid copolymer, available from MITSUI-DUPONT POLYCHEMICAL.
HIMILAN 1706: an ionomer resin of a zinc ion-neutralized ethylene-methacrylic acid copolymer, available from MITSUI-DUPONT POLYCHEMICAL.
HIMILAN 1707: an ionomer resin of a sodium ion-neutralized ethylene-methacrylic acid copolymer, available from MITSUI-DUPONT POLYCHEMICAL.

(3) Preparation of the Golf Ball Body

The cover composition thus prepared was directly injection-molded onto the core to form the cover, thereby obtaining the two-piece golf ball body having a diameter of 42.7 mm. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After cooling for 30 seconds, the molds were opened and then the golf ball body was discharged. Dimples were formed on the surface of the golf ball.

[Production of Golf Ball Body B]

(1) Preparation of One-Piece Golf Ball

The rubber composition shown in Table 1 was kneaded and heat-pressed with upper and lower molds each having a spherical cavity under the heating condition of 170° C. for 17 minutes to obtain the one-piece golf ball having a diameter of 42.8 mm. Dimples were formed on the surface of the golf ball.

[Formation of Mark and Paint Film]

The surfaces of the obtained golf ball bodies were subjected to the sandblast treatment. The two-component curing type aqueous urethane-based paint shown in Tables 2 to 5 was applied to the heated golf ball bodies with the air-gun. The paint was dried in the oven heated at 40° C. to form the painted golf balls having the paint film with the thickness of 10 μm. The application of the paint was conducted immediately after (A) the aqueous polyol composition and (B) the aqueous polyisocyanate were mixed. The appearance of the resultant painted golf ball, the evenness and the adhesion of the formed paint film were evaluated and the results thereof were also shown in Tables 2 to 5.

TABLE 2

| | | | | Painted golf ball | | | |
|---|---|---|---|---|---|---|---|
| | | | | 1 | 2 | 3 | 4 |
| Paint | Formulation | Golf ball body No. | | A | A | A | A |
| | | (A) Aqueous polyol composition | (a-1) Aqueous acrylic polyol 1 | 35 | 70 | 30 | — |
| | | | (a-2) Aqueous acrylic polyol 2 | — | — | — | 50 |
| | | | (a-2) Aqueous urethane polyol | 15 | 30 | — | — |
| | | | (a-3) Aqueous urethane resin 1 | 50 | — | — | — |
| | | | (a-3) Aqueous urethane resin 2 | — | — | 70 | 50 |
| | | (B) Aqueous polyisocyanate | (b-1) HDI derivative | 67.0 | 134.0 | 25.1 | 37.4 |
| | | | (b-2) IPDI derivative | 22.3 | 44.7 | 8.4 | 12.5 |
| | | Content of Leveling agent in Paint (mass %) | | 0.7 | 0.4 | 0.9 | 0.7 |
| | | Mass ratio of (a-1)/(a-2) in (A) Aqueous polyol composition | | 70/30 | 70/30 | 100/0 | 100/0 |
| | | Mass ratio of (b-1)/(b-2) in (B) Aqueous polyisocyanate | | 75/25 | 75/25 | 75/25 | 75/25 |
| | | Molar ratio (NCO/OH) of NCO of (B) aqueous polyisocyanate/OH of (A) aqueous polyol composition | | 2.0 | 2.0 | 2.0 | 1.5 |
| | | Non-volatile content in (A) aqueous polyol composition (mass %) | | 44.3 | 58.6 | 46.0 | 40.0 |
| | Paint Property | Viscosity (mPa·s) | | 155 | 193 | 120 | 182 |
| | | Contact angle to ionomer resin (°) | | 40 | 44 | 45 | 44 |
| | | Contact angle to rubber composition (°) | | 43 | 47 | 48 | 47 |
| | | Contact angle to the resin component constituting the outermost layer of golf ball body (°) | | 40 | 44 | 45 | 44 |
| | Film Property | 10% stress (MPa) | | 4.3 | 16.4 | 11.3 | 17.4 |
| | | Maximum stress (MPa) | | 12.3 | 23.3 | 26.5 | 20.4 |
| | | Elongation at break (%) | | 93 | 71 | 152 | 73 |
| | | Reflectivity at incident angle of 20° | | 80 | 80 | 81 | 82 |
| Evaluation of Painted Golf ball | | Appearance of golf ball | | G | G | G | G |
| | | Evenness of film thickness | | E | E | G | E |
| | | Adhesion of paint film | | G | P | G | P |

Formulation: Parts by mass (based on Non-volatile content)

TABLE 3

| | | | | Painted golf ball | | | |
|---|---|---|---|---|---|---|---|
| | | | | 5 | 6 | 7 | 8 |
| Paint | Formulation | Golf ball body No. | | A | A | A | A |
| | | (A) Aqueous polyol composition | (a-1) Aqueous acrylic polyol 1 | 40 | 25 | 10 | 35 |
| | | | (a-2) Aqueous acrylic polyol 2 | — | — | — | — |
| | | | (a-2) Aqueous urethane polyol | 5 | 10 | 5 | 15 |
| | | | (a-3) Aqueous urethane resin 1 | 55 | 65 | 85 | 50 |
| | | | (a-3) Aqueous urethane resin 2 | — | — | — | — |
| | | (B) Aqueous polyisocyanate | (b-1) HDI derivative | 46.0 | 34.6 | 18.8 | 33.5 |
| | | | (b-2) IPDI derivative | 15.3 | 11.5 | 6.3 | 11.2 |
| | | Content of Leveling agent in Paint (mass %) | | 0.2 | 0.5 | 0.5 | 0.5 |
| | | Mass ratio of (a-1)/(a-2) in (A) Aqueous polyol composition | | 89/11 | 71/29 | 75/25 | 70/30 |
| | | Mass ratio of (b-1)/(b-2) in (B) Aqueous polyisocyanate | | 75/25 | 75/25 | 75/25 | 75/25 |
| | | Molar ratio (NCO/OH) of NCO of (B) aqueous polyisocyanate/OH of (A) aqueous polyol composition | | 2.0 | 1.5 | 1.5 | 1.0 |
| | | Non-volatile content in (A) aqueous polyol composition (mass %) | | 39.3 | 39.8 | 35.3 | 44.3 |
| | Paint Property | Viscosity (mPa·s) | | 160 | 133 | 133 | 145 |
| | | Contact angle to ionomer resin (°) | | 42 | 43 | 43 | 44 |
| | | Contact angle to rubber composition (°) | | 45 | 45 | 45 | 47 |
| | | Contact angle to the resin component constituting the outermost layer of golf ball body (°) | | 42 | 43 | 43 | 44 |
| | Film Property | 10% stress (MPa) | | 8.9 | 3.2 | 3.2 | 3.1 |
| | | Maximum stress (MPa) | | 19.2 | 19.1 | 19.1 | 8.5 |
| | | Elongation at break (%) | | 89 | 267 | 315 | 91 |
| | | Reflectivity at incident angle of 20° | | 74 | 72 | 72 | 77 |
| Evaluation of Painted Golf ball | | Appearance of golf ball | | G | G | G | G |
| | | Evenness of film thickness | | E | E | E | E |
| | | Adhesion of paint film | | F | F | F | P |

Formulation: Parts by mass (based on Non-volatile content)

TABLE 4

| | | | | Painted golf ball | | | |
|---|---|---|---|---|---|---|---|
| | | | | 9 | 10 | 11 | 12 |
| Paint | Formulation | | Golf ball body No. | A | A | A | A |
| | | (A) | (a-1) Aqueous acrylic polyol 1 | 35 | 35 | 35 | 35 |
| | | Aqueous | (a-2) Aqueous acrylic polyol 2 | — | — | — | — |
| | | polyol | (a-2) Aqueous urethane polyol | 15 | 15 | 15 | 15 |
| | | composition | (a-3) Aqueous urethane resin 1 | 50 | 50 | 50 | 50 |
| | | | (a-3) Aqueous urethane resin 2 | — | — | — | — |
| | | (B) Aqueous | (b-1) HDI derivative | 67.0 | 67.0 | 67.0 | 67.0 |
| | | polyisocyanate | (b-2) IPDI derivative | 22.3 | 22.3 | 22.3 | 22.3 |
| | | Content of Leveling agent in Paint (mass %) | | 0.5 | 0.5 | 1.0 | 1.0 |
| | | Mass ratio of (a-1)/(a-2) in (A) Aqueous polyol composition | | 70/30 | 70/30 | 70/30 | 70/30 |
| | | Mass ratio of (b-1)/(b-2) in (B) Aqueous polyisocyanate | | 75/25 | 75/25 | 75/25 | 75/25 |
| | | Molar ratio (NCO/OH) of NCO of (B) aqueous polyisocyanate/OH of (A) aqueous polyol composition | | 2.0 | 2.0 | 2.0 | 2.0 |
| | | Non-volatile content in (A) aqueous polyol composition (mass %) | | 44.3 | 44.3 | 44.3 | 44.3 |
| | Paint Property | Viscosity (mPa·s) | | 42 | 68 | 337 | 366 |
| | | Contact angle to ionomer resin (°) | | 43 | 42 | 38 | 37 |
| | | Contact angle to rubber composition (°) | | 45 | 45 | 41 | 40 |
| | | Contact angle to the resin component constituting the outermost layer of golf ball body (°) | | 43 | 42 | 38 | 37 |
| | Film Property | 10% stress (MPa) | | 4.3 | 4.3 | 4.3 | 4.3 |
| | | Maximum stress (MPa) | | 12.3 | 12.3 | 12.3 | 12.3 |
| | | Elongation at break (%) | | 93 | 93 | 93 | 93 |
| | | Reflectivity at incident angle of 20° | | 80 | 81 | 80 | 79 |
| Evaluation of Painted Golf ball | | | Appearance of golf ball | G | G | G | P |
| | | | Evenness of film thickness | P | E | E | P |
| | | | Adhesion of paint film | G | G | G | G |

Formulation: Parts by mass (based on Non-volatile content)

TABLE 5

| | | | | Painted golf ball | | | |
|---|---|---|---|---|---|---|---|
| | | | | 13 | 14 | 15 | 16 |
| Paint | Formulation | | Golf ball body No. | B | A | A | A |
| | | (A) | (a-1) Aqueous acrylic polyol 1 | 35 | 70 | — | — |
| | | Aqueous | (a-2) Aqueous acrylic polyol 2 | — | — | — | 33 |
| | | polyol | (a-2) Aqueous urethane polyol | 15 | 30 | — | — |
| | | composition | (a-3) Aqueous urethane resin 1 | 50 | — | — | — |
| | | | (a-3) Aqueous urethane resin 2 | — | — | 100 | 67 |
| | | (B) Aqueous | (b-1) HDI derivative | 67.0 | 134.0 | — | 24.7 |
| | | polyisocyanate | (b-2) IPDI derivative | 22.3 | 44.7 | — | 8.2 |
| | | Content of Leveling agent in Paint (mass %) | | 0.5 | — | 0.5 | — |
| | | Mass ratio of (a-1)/(a-2) in (A) Aqueous polyol composition | | 70/30 | 70/30 | — | 100/0 |
| | | Mass ratio of (b-1)/(b-2) in (B) Aqueous polyisocyanate | | 75/25 | 75/25 | — | 75/25 |
| | | Molar ratio (NCO/OH) of NCO of (B) aqueous polyisocyanate/OH of (A) aqueous polyol composition | | 2.0 | 2.0 | — | 1.5 |
| | | Non-volatile content in (A) aqueous polyol composition (mass %) | | 44.3 | 58.6 | — | 38.3 |
| | Paint Property | Viscosity (mPa·s) | | 155 | 152 | 167 | 211 |
| | | Contact angle to ionomer resin (°) | | 40 | 48 | 42 | 49 |
| | | Contact angle to rubber composition (°) | | 43 | 51 | 45 | 52 |
| | | Contact angle to the resin component constituting the outermost layer of golf ball body (°) | | 43 | 48 | 42 | 49 |
| | Film Property | 10% stress (MPa) | | 4.3 | 33.1 | 1.8 | 12.2 |
| | | Maximum stress (MPa) | | 12.3 | 35.4 | 23.8 | 25.7 |
| | | Elongation at break (%) | | 93 | 32 | 307 | 148 |
| | | Reflectivity at incident angle of 20° | | 80 | 85 | 70 | 79 |
| Evaluation of Painted Golf ball | | | Appearance of golf ball | G | G | F | G |
| | | | Evenness of film thickness | G | P | E | P |
| | | | Adhesion of paint film | G | P | P | G |

Formulation: Parts by mass (based on Non-volatile content)

Notes on Tables 2 to 5:

Aqueous acrylic polyol 1: an aqueous acrylic polyol (hydroxyl value: 108 mgKOH/g, average number of hydroxyl group: 28.8, glass transition temperature: 46° C., non-volatile: 46 mass %, weight average molecular weight: 15,000) available from SHINTO PAINT Aqueous acrylic polyol 2: "Bayhydrol (registered trademark) XP2470" (hydroxyl value: 128.7 mgKOH/g, average number of hydroxyl group: 28.9, glass transition temperature: 50° C., non-volatile: 45 mass %, weight average molecular weight: 12,600) available from Sumika Bayer Urethane Co., Ltd Aqueous urethane polyol: "FLEXOREZ(registered trademark)) UD-350W" (hydroxyl value: 325 mgKOH/g, average number of hydroxyl group: 2.3, non-volatile: 88 mass %, weight average molecular weight 400) available from available from King Industries, Inc.

Aqueous urethane resin 1: "SUPERFLEX (registered trademark) 300" (glass transition temperature: −40° C., Non-volatile content: 30 mass %, Elongation: 1500%) available from Dai-ichi Kogyo Seiyaku Co., Ltd Aqueous urethane resin 2: "Bayhydrol (registered trademark) 124" (glass transition temperature: −56° C., non-volatile: 35 mass %) available from Sumika Bayer Urethane Co., Ltd HDI derivative: "Bayhydur (registered trademark) 305" (NCO content: 16.2 mass %, non-solvent) available from Sumika Bayer Urethane Co., Ltd.

IPDI derivative: "Bayhydur (registered trademark) 401-70" (NCO content: 9.4 mass %, non-volatile: 70 mass %) available from Sumika Bayer Urethane Co., Ltd.

Leveling agent: "BYK-333 (polyether-modified polydimethylsiloxane)", commercially available from BYK Japan KK Painted golf balls No. 1 to 13 are the painted golf balls obtained by applying a two-component curing type urethane-based aqueous golf ball paint containing (A) an aqueous polyol composition and (B) an aqueous polyisocyanate, wherein the paint has a contact angle of 45° or less to the resin component constituting the outermost layer of the golf ball body and the paint film has reflectivity of 70% or more at an incident angle of 20°. These painted golf ball were excellent in appearance, and the evenness of the paint film. Among them, since the viscosity of the paint was slightly low, the evenness of the paint film was slightly low in the painted golf ball No. 9. Further, since the viscosity was slightly high, appearance and the evenness of the paint film was slightly low in the painted golf ball No. 12.

Among the golf balls No. 1 to 15, the golf balls No. 1, 3, 5, 6, 10, 11, and 13 that satisfy the 10% stress of the paint film: 2.0 MPa to 35 MPa, maximum stress: 10.0 MPa to 50 MPa, and elongation at break: 85% to 300%, were excellent in the adhesion of the paint film.

The painted golf balls No. 14 and 16 are the cases that the contact angle of the paint to the resin component constituting the outermost layer of the golf ball body is more than 45°. The evenness of the paint film was low. The painted golf ball No. 15 is the case that the paint does not contain (B) the aqueous polyisocyanate, the adhesion of the paint film was low.

According to the present invention, it is possible to obtain the golf ball which is excellent in the gloss of the paint film, the even thickness of the paint film, and the adhesion of the paint film to the golf ball body. This application is based on Japanese Patent application No. 2008-334978 filed on Dec. 26, 2008, the contents of which are hereby incorporated by reference.

The invention claimed is:

1. A two-component curing type urethane-based aqueous golf ball paint comprising (A) an aqueous polyol composition and (B) an aqueous polyisocyanate, wherein the aqueous golf ball paint has a contact angle of 45° or less to body an ionomer resin and in the form of a paint film has reflectivity of 70% or more at an incident angle of 20°,
wherein (A) the aqueous polyol composition contains (a-1) an aqueous acrylic polyol, (a-2) an aqueous urethane polyol and (a-3) an aqueous urethane resin, and a content of (a-3) the aqueous urethane resin in (A) the aqueous polyol composition ranges from 20 mass % to 80 mass %.

2. The two-component curing type urethane-based aqueous golf ball paint according to claim 1, wherein the aqueous golf ball paint has a viscosity ranging from 50 mPa·s to 350 mPa·s.

3. The two-component curing type urethane-based aqueous golf ball paint according to claim 1, wherein the paint film properties of the aqueous golf ball paint satisfy the 10% stress: 2.0 MPa to 35 MPa, maximum stress: 10.0 MPa to 50 MPa, and elongation at break: 85% to 300%.

4. The two-component curing type urethane-based aqueous golf ball paint according to claim 1, wherein a molar ratio (NCO/OH) of an isocyanate group of (B) the aqueous polyisocyanate to a hydroxyl group of (A) the aqueous polyol composition ranges from 1.25 to 2.50.

5. The two-component curing type urethane-based aqueous golf ball paint according to claim 1, wherein (a-1) the aqueous acrylic polyol has a hydroxyl value ranging from 50 mg KOH/g to 150 mg KOH/g, and a glass transition temperature ranging from 20° C. to 60° C.

6. The two-component curing type urethane-based aqueous golf ball paint according to claim 1, wherein (a-1) the aqueous acrylic polyol has a weight average molecular weight ranging from 3,000 to 50,000.

7. The two-component curing type urethane-based aqueous golf ball paint according to claim 1, wherein (a-2) the aqueous urethane polyol has a hydroxyl value ranging from 50 mg KOH/g to 500 mg KOH/g.

8. The two-component curing type urethane-based aqueous golf ball paint according to claim 1, wherein (a-2) the aqueous urethane polyol has a weight average molecular weight ranging from 200 to 50,000.

9. The two-component curing type urethane-based aqueous golf ball paint according to claim 1, wherein (a-3) the aqueous urethane resin has a glass transition temperature ranging from −50° C. to 20° C.

10. The two-component curing type urethane-based aqueous golf ball paint according to claim 1, wherein an aqueous liquid of (a-3) the aqueous urethane resin has a volume average particle diameter ranging from 50 nm to 300 nm.

11. The two-component curing type urethane-based aqueous golf ball paint according to claim 1, wherein (A) the aqueous polyol composition has a non-volatile content from 20 mass % to 85 mass %.

12. The two-component curing type urethane-based aqueous golf ball paint according to claim 1, further comprising a leveling agent in a content from 0.05 mass % to 3 mass %.

13. The two-component curing type urethane-based aqueous golf ball paint according to claim 1, wherein a blending ratio (a-1)/(a-2) (total: 100 mass %) of (a-1) the aqueous acrylic polyol to (a-2) the aqueous urethane polyol in (A) the aqueous polyol composition is 40 mass % to 90 mass %/60 mass % to 10 mass %.

14. The two-component curing type urethane-based aqueous golf ball paint according to claim 1, wherein (B) the aqueous polyisocyanate contains (b-1) hexamethylene diisocyanate and/or a derivative thereof, and (b-2) isophorone diisocyanate and/or a derivative thereof.

15. The two-component curing type urethane-based aqueous golf ball paint according to claim 14, wherein a blending ratio (b-1)/(b-2) (total: 100 mass %) of (b-1) hexamethylene diisocyanate and/or the derivative thereof to (b-2) isophorone diisocyanate and/or the derivative thereof is 50 mass % to 99 mass %/50 mass % to 1 mass %.

16. A painted golf ball comprising
a golf ball body, and
a paint film formed on the golf ball body,
wherein the paint film is formed from a two-component curing type urethane-based aqueous golf ball paint comprising (A) an aqueous polyol composition and (B) an aqueous polyisocyanate, wherein the aqueous golf ball paint has a contact angle of 45° or less to a resin component constituting an outermost layer of the golf ball body and the paint film has reflectivity of 70% or more at an incident angle of 20°, wherein (A) the aqueous polyol composition contains (a-1) an aqueous acrylic polyol, (a-2) an aqueous urethane polyol and (a-3) an aqueous urethane resin, and a content of (a-3) the aqueous urethane resin in (A) the aqueous polyol composition ranges from 20 mass % to 80 mass %.

17. The painted golf ball according to claim 16, wherein the paint film properties of the aqueous golf ball paint satisfy the 10% stress: 2.0 MPa to 35 MPa, maximum stress: 10.0 MPa to 50 MPa, and elongation at break: 85% to 300%.

18. The painted golf ball according to claim 16, wherein the resin component constituting the outermost layer of the golf ball body is an ionomer resin or a rubber composition.

19. The painted golf ball according to claim 16, wherein the paint film has a thickness ranging from 4 μm to 50 μm.

20. A two-component curing type urethane-based aqueous golf ball paint comprising (A) an aqueous polyol composition and (B) an aqueous polyisocyanate, wherein the aqueous golf ball paint has a contact angle of 45° or less to a rubber composition and in the form of a paint film has a reflectivity of 70% or more at an incident angle of 20°,
wherein (A) the aqueous polyol composition contains (a-1) an aqueous acrylic polyol, (a-2) an aqueous urethane polyol and (a-3) an aqueous urethane resin, and a content of (a-3) the aqueous urethane resin in (A) the aqueous polyol composition ranges from 20 mass % to 80 mass %.

* * * * *